United States Patent [19]
Karl

[11] Patent Number: 5,934,097
[45] Date of Patent: Aug. 10, 1999

[54] MODULAR COMPONENT FOR A REFRIGERANT FLUID CIRCUIT, IN PARTICULAR FOR AIR CONDITIONING THE CABIN OF A MOTOR VEHICLE

[75] Inventor: Stefan Karl, Paris, France

[73] Assignee: Valeo Climatisation, La Verriere, France

[21] Appl. No.: 08/968,445

[22] Filed: Nov. 12, 1997

[30] Foreign Application Priority Data

Nov. 12, 1996 [FR] France .................................. 96 13750

[51] Int. Cl.⁶ .................................................. F25B 41/04
[52] U.S. Cl. .......................................................... 62/324.6
[58] Field of Search ................................ 62/324.1, 324.6; 137/884

[56] References Cited

U.S. PATENT DOCUMENTS

| | | | |
|---|---|---|---|
| 3,928,984 | 12/1975 | Nickell | 62/196 |
| 4,055,056 | 10/1977 | Perkins | 62/324.6 |
| 4,313,314 | 2/1982 | Boyankch | 62/324.1 |
| 4,760,709 | 8/1988 | Aoki et al. | 62/324.6 |
| 5,131,240 | 7/1992 | Kohashi et al. | 62/324.1 |
| 5,709,247 | 1/1998 | Hutton | 137/884 |
| 5,755,111 | 5/1998 | Toyama | 62/324.6 |

FOREIGN PATENT DOCUMENTS

| | | |
|---|---|---|
| 0 682 217 | 11/1995 | European Pat. Off. . |
| 0 733 504 | 9/1996 | European Pat. Off. . |
| 2717126 | 9/1995 | France . |

OTHER PUBLICATIONS

Patent Abstracts of Japan vol. 016 No. 057 (M–1210), Feb. 13, 1992 and JP 03 255864 A (Mitsubishi Electric), Nov. 14, 1991.

French Search Report dated Jul. 25, 1997.

*Primary Examiner*—William E. Tapolcai
*Attorney, Agent, or Firm*—Morgan & Finnegan, L.L.P.

[57] ABSTRACT

A refrigerant fluid circuit for a motor vehicle air conditioning installation has three branches, with two three-way valves for selectively passing fluid from the first branch into either the second branch to establish a cooling loop, or into the third branch to establish a heating loop. The three-way valves and a second expansion device in the third branch of the circuit, are incorporated in a modular component which comprises a monobloc body; the monobloc body having three body ports for connection in the three branches of the circuit, and further body ports which are arranged to be connected to the inlet and outlet, respectively of the compressor of the circuit.

14 Claims, 1 Drawing Sheet

MODULAR COMPONENT FOR A REFRIGERANT FLUID CIRCUIT, IN PARTICULAR FOR AIR CONDITIONING THE CABIN OF A MOTOR VEHICLE

FIELD OF THE INVENTION

This invention relates to refrigerant circuits, in particular for air conditioning the cabin of a motor vehicle.

More particularly, the invention relates to components of a refrigerant fluid circuit that comprises a first branch containing an evaporator followed by a compressor, a second branch containing a condenser, and a third branch containing no condenser, the second and third branches being connected in parallel with each other so as to constitute, with the first branch, respectively, a cooling loop, which also contains a first expansion device interposed between the condenser and the evaporator, and a heating loop, the circuit further including a second expansion device disposed in the third branch, and fluid flow switching means for passing fluid taken from the first branch selectively into the second branch, to establish the cooling loop, or into the third branch to establish the heating loop.

BACKGROUND OF THE INVENTION

A refrigerant fluid circuit of the above type is known from French patent specification No. FR 2 717 126A. This known circuit also includes means for delivering into the cabin a vehicle air which has undergone heat exchange with the evaporator.

The fluid flow switching means mentioned above enables the circuit to operate in three different configuration modes in which it operates, respectively in: a conventional air conditioning circuit mode using the cooling loop; a heating mode using the heating loop; and a third mode (or "fluid charging" mode), in which the refrigerant fluid is accumulated in the evaporator.

This known type of circuit has the disadvantage that it makes it necessary to provide a large number of components, which is detrimental to standardization and also increases its overall size.

DISCUSSION OF THE INVENTION

A main object of the invention is to overcome the above mentioned drawback. In particular, the invention provides a modular component of the circuit, also referred to as a "module", in which several functions, that until now have had to be provided by separate elements, are grouped in a single unit.

According to the invention, a component it provided for a refrigerant fluid circuit that comprises a first branch containing an evaporator followed by a compressor, a second branch containing a condenser, and a third branch containing no condenser, the second and third branches being connected in parallel with each other so as to constitute, with the first branch, respectively, a cooling loop, which also contains a first expansion device interposed between the condenser and the evaporator, and a heating loop. The circuit further includes a second expansion device disposed in the third branch, together with fluid flow switching means for passing fluid taken from the first branch selectively into the second branch and the third branch, wherein the component is a modular component comprising a monobloc element or body, said monobloc element containing the fluid flow switching means and the second expansion device, the body including a first, a second and a third body port, which are adapted to be connected to the first, second and third branches of the circuit, respectively together with a fourth body port and a fifth body port arranged to be connected to the inlet and the outlet of the compressor; respectively.

The monobloc element according to the invention, incorporating the fluid flow switching means (i.e. the two valves) and the second expansion device, is adapted to be connected directly to the three branches of the circuit on the one hand, and to the compressor on the other hand.

In a preferred embodiment of the invention, the fluid flow switching means contained in the monobloc element comprise a first three-way valve and a second three-way valve.

Preferably with this arrangement, the first three-way valve has a first valve port connected to the first body port for connection to the outlet of the evaporator, and a second valve port connected to the fourth body port for connection to the compressor inlet, wherein the second three-way valve has first, second and third valve ports connected to the fifth body port for connection to the compressor outlet; the second body port for connection to the second branch of the circuit; and the second expansion device respectively; the second expansion device being connected to the third body port, and a fourth circuit branch, which is also contained in the monobloc element, is connected to the third valve port of the first valve to the second body port for connection to the second branch of the circuit.

According to another preferred feature of the invention, the modular component further includes coordinated control means for the two valves, causing the selective communication of either: the first and second valve ports of the first valve with the first and second valve ports of the second valve so as to establish the cooling and fluid discharge loop; or the first and second valve ports of the first valve with the first and third valve ports of the second valve so as to establish the heating loop; or the second and third valve ports of the first valve with the first and third valve ports of the second valve so as to establish a fluid charging path.

Preferably, the first three-way valve and the second three-way valve have respective valve members which are displaceable along parallel axes.

It is further preferred that the second expansion device comprises an adjustable valve member which is displaceable along an axis parallel to the respective axes of the first and second three-way valves.

According to a further preferred feature of the invention, the first body port and the third body port are situated on a main or major face of the monobloc element.

Preferably, the fourth body port and the first body port are situated on a second main or major face of the monobloc element, opposite to the first main face.

According to yet another preferred feature of the invention, the second body port is situated on a first side face of the monobloc element which joins together the two main faces of the latter.

According to a still further preferred feature of the invention, the second body port communicates, through a cross passage, with a symmetrical aperture situated on a second side face of the monobloc element, whereby to provide two alternative positions on the body for connection of the second branch of the circuit.

Preferably, the cross passage also constitutes the fourth branch of the circuit, and communicates with the third valve port of the first valve and the second valve port of the second valve.

The three-way valves are preferably electromechanical valves having control means situated on the outside of the monobloc element.

The monobloc element is preferably a machine block of metallic material, in particular an aluminium alloy.

Preferably, the monobloc element is substantially in the form of a parallelepiped.

Further features and advantages of the invention are provided in the following detailed description of a preferred embodiment of the invention, which is given by way of non-limiting example only and with reference to the accompanying drawings.

DESCRIPTION OF A PREFERRED EMBODIMENT OF THE INVENTION

Figure 1:
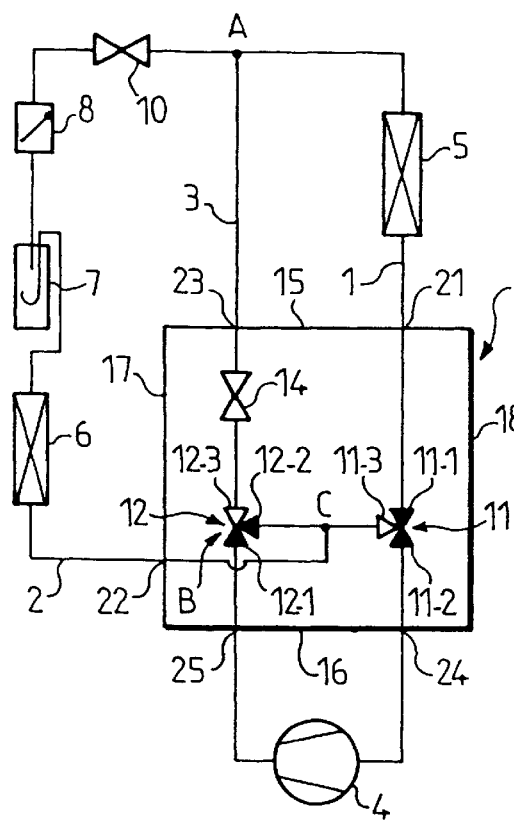
FIG. 1 is a circuit diagram of a refrigerant fluid circuit for air conditioning and heating the cabin of a motor vehicle, this circuit incorporating a modular component in accordance with the invention.

Referring to FIG. 1, there is a circuit in which a refrigerant fluid flows. In operation, this fluid passes from the liquid state to the gaseous state by absorbing heat, and from the gaseous state to the liquid state by yielding heat, as is commonly the case in installations for air conditioning motor vehicles.

The circuit shown in FIG. 1 comprises three branches 1, 2 and 3, which are joined together at two junction points A and B. The branch 1 contains a compressor 4 which causes the fluid to flow in branch 1 from point A to point B, together with an evaporator 5 which is connected upstream of the compressor. The portion of branch 2 going from point B towards the point A, containing a condenser 6, a bottle or reservoir 7, a non-return valve 8, and a first expansion device 10. A second expansion device 14 is connected in branch 3. The circuit also includes fluid flow switching means in the form of two three-way valves 11 and 12.

The first three-way valve 11 is interposed in branch 1, such that two of its three valve ports, 11-1 and 11-2, communicate respectively with the outlet of the evaporator 5 and the inlet of the compressor 4. The valve 11 also has a third valve port 11-3. The second three-way valve 12 is connected at the junction point B, with its three valve ports 12-1, 12-2 and 12-3 being connected, respectively, to the downstream end of first branch 1, i.e., to the outlet of compressor 4, to the upstream end of second branch 2, i.e. to the inlet of the condenser 6, and to the upstream end of the third branch 3, i.e. to the inlet of the expansion device 14. Finally, a fourth branch 13 containing no component of the circuit, connects the third valve port 11-3 of the electromechanical valve 11 to an intermediate point C in the branch 2, wherein point C is between the port 12-2 of the valve 12 and the condenser 6.

The structure of the circuit in FIG. 1 generally disclosed in French patent specification No. FR 2 717 126A cited herein. In this circuit, the electromagnetic valves 11 and 12 are controlled in a coordinated manner so as to enable the three different configurations, described in the above mentioned French patent specification, representing the three operating modes mentioned earlier herein, to be obtained.

In the configuration shown in FIG. 1, each of the two valves 11 and 12 places its first and second ports 1 and 2 into communication with each other as indicated by the two black triangles in each case. The fluid flows in the closed loop consisting of the branches 1 and 2, the branch 3 and the branch 13 being isolated by the valves 12 and 11 respectively. This closed loop functions as a conventional air conditioning circuit (cooling loop), with the fluid passing from the liquid state to the gaseous state in the evaporator 5 by absorbing heat, and from the gaseous state to the liquid state in the condenser 6 by yielding heat. The heat absorbed in the evaporator 5 can be taken directly or indirectly away in a stream of air to be delivered into the cabin of the vehicle.

The circuit shown in FIG. 1 further includes a modular component M, or module, which is made in the form of a monobloc element comprising a body, the general form of which is that of a parallelepiped, obtained by machining of a metallic material, which is preferably an aluminum alloy.

Figure 3:
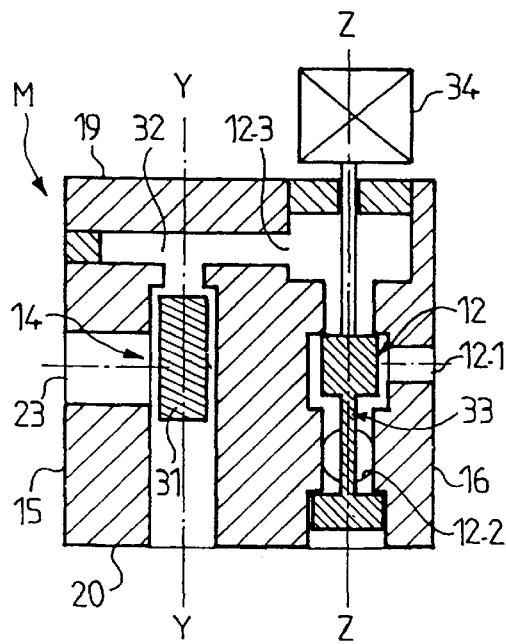
FIG. 3 is a diagrammatic cross sectional view taken on the line III—III in FIG. 2.
Figure 4:
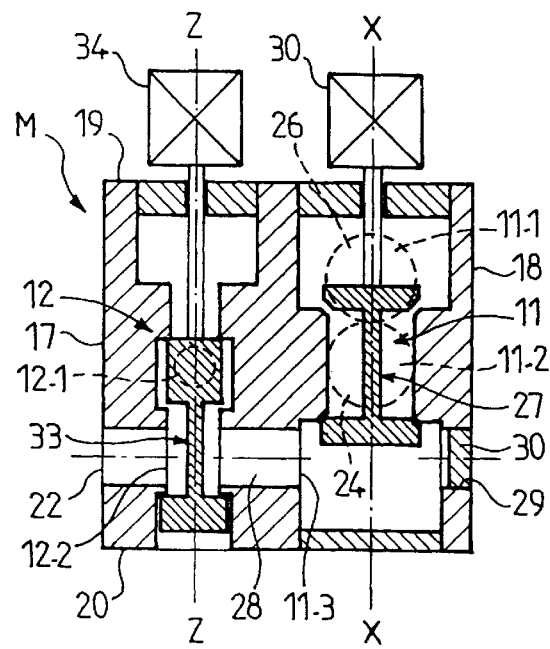
FIG. 4 is a diagrammatic cross sectional view taken on the line IV—IV in FIG. 2.

The body of the modular component M has two main faces 15 and 16 opposed to each other, two side faces 17 and 18, also opposed to each other and joining together the faces 15 and 16, a top face 19 and a bottom face 20 (see FIGS. 3 and 4).

The body of the monobloc element contains the two valves 11 and 12 and the second expansion device 14. In addition, it has first, second and third body ports 21, 22 and 23 respectively, for connection to the first, second and third branches 1, 2 and 3 respectively; it also has a fourth body port 24 and a fifth body port 25, for connection to the inlet and outlet, respectively, of compressor 4.

Figure 2:
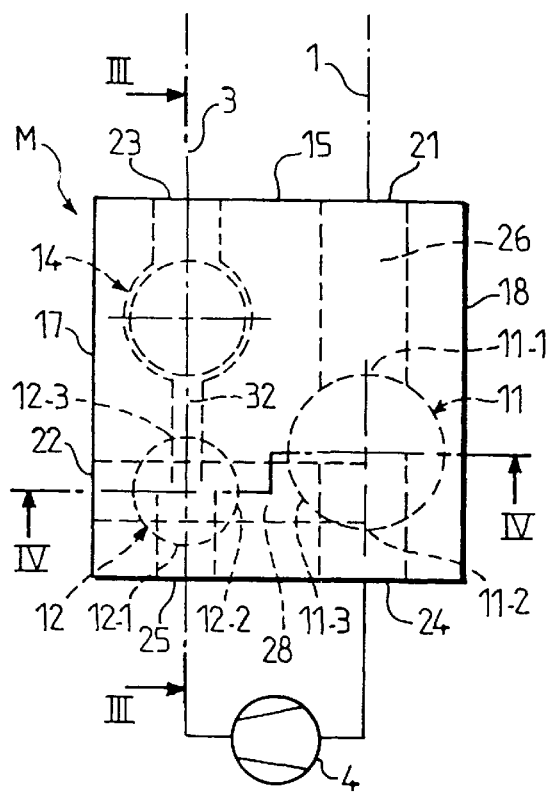
FIG. 2 is a diagrammatic top plane view of the modular component of FIG. 1.

As can be seen more particularly, in FIGS. 1 and 2, the ports 21 and 23 are situated in the main face 15 of the body of the module M, and the ports 24 and 25 are situated in the main face 16 opposite face 15. The port 22 is formed in the side face 17.

The ports 21 to 25 are formed by machining in the body of the module, and are open into bores formed in the body, wherein the bores establish circuit connections for the valves 11 and 12 and the expansion device 14 contained within the body.

The structure of the modular component M will now be described in greater detail with reference to FIGS. 2 and 4. The port 21 is open into an axial passage 26 (FIGS. 2 and 4), which is in communication with the first port 11-1 of the valve 11. The valve 11 itself comprises a valve member 27 (see FIG. 4), which is displaceable along an axis XX which extends transversely with respect to the top face 19 and the bottom face 20 of the body.

The port 24 (see FIGS. 2 and 4) is in direct communication with the second port 11-2 of the valve 11. The third port 11-3 of the valve 11 is in communication with a first cross passage 28, formed in the body and shown in FIGS. 2 and 4. This cross passage 28 extends transversely between the side faces 17 and 18 of the body, and is open in the side face 17 through the second port 22. The passage 28 terminates in the other side face 18 in an aperture 29 which is symmetrical with the port 22.

As can be seen in FIG. 4, the aperture 29 is in fact closed by a plug 30, in this example, and the branch 2 of the circuit is connected through the second port 22. Instead, however, the port 22 may be closed off, the aperture 29 then being used for connection in the branch 2.

The valve 11 is an electromechanical valve which includes suitable control means 30, in this example, an electromagnet, arranged on the outside of the body of the module M, on the same side as its top face 19, as indicated in FIG. 4. The valve member 27 can thus, be displaced by the electromagnet 11 between two positions, namely, a first position shown in FIG. 4, in which the valve member puts the port 11-2 into communication with the port 11-1, and a second position, not shown, in which the valve member puts the port 11-2 into communication with the port 11-3.

The third port 23, as shown in FIG. 3, is open directly into a chamber which is part of the second expansion device 14. The device 14 comprises a controlled valve member 31 which is displaceable along an axis YY parallel to the axis XX. The valve member 31 controls the inlet of a second cross passage 32 which communicates with the port 12-3 of the valve 12. The valve 12 itself includes a valve member 33 which is displaceable axially along an axis ZZ parallel to the axes XX and YY, as shown in FIGS. 3 and 4. The port 25 (see FIG. 2) is in direct communication with the port 12-1 of the valve 12. The port 12-2 of the valve 12 is in direct communication with the first cross passage 28.

In FIG. 4, the valve 12 is an electromechanical valve having control means 34, which consists of an electromagnet, mounted on the outside of the body of the module M on the same side as the electromagnet 30. The valve member 33 is arranged to put the port 12-1, connected to the outlet of the compressor 4, into selective communication with the port 12-2 connected to the branch 2, as shown in FIGS. 3 and 4, or with the port 12-3 connected with the second expansion device 14 on the branch 3. In the position shown in FIGS. 3 and 4, the valve member 33 puts the ports 12-1 and 12-2 of the valve 12 into communication with each other, as mentioned above. The fif6h body port 25, connected to the outlet of the compressor 4 is therefore, in communication with the cross passage 28 which leads to the port 22. It will be noted that the cross passage 28 constitute the fourth branch 13 of FIG. 1. As a result, as indicated above, the fluid flows in a closed loop which, in this mode, operates as a conventional air conditioning circuit.

The circuit of FIG. 1 an assume two other configurations, in the manner described in French patent specification No. FR 2 717 126A. Thus, besides the configuration shown in FIG. 1, it can work in an alternative mode in which the valve 11-1 still puts ports 1 and 2 into communication with each other, while the valve 12 puts its ports 1 and 3 into communication with each other. The fluid then flows in a closed heating loop consisting of the branches 1 and 3, with the branch 2 and the branch 13 being isolated by the valves 12 and 11, respectively. The fluid, thus, flows through the compressor 4, the evaporator 5 and the expansion device 14. Since the fluid no longer passes through the condenser, it remains in the gaseous state at all times, while the evaporator 5 no longer functions as an evaporator but continues to operate as a heat exchanger. In this heating mode, the evaporator enables a high proportion of the heat produced by compression, of the fluid in the compressor 4, to be dissipated, and this heat can be used for heating the cabin of the vehicle when the engine of the vehicle is cold. In particular, the fluid which is flowing is at a temperature higher than ambient temperature, so that a stream of air to be delivered into the cabin can be heated directly by contact with the evaporator.

The circuit is also able to assume a third configuration representing the fluid charging mode of operation, in which the valves 11 and 12 provide communication, firstly between the ports 11-3 and 11-2, and secondly between the ports 12-1 and 12-3. The inlet of the compressor is then connected through the branch 13 to the normal inlet 6-1 of the condenser 6, from which it is able to extract fluid in the gaseous state. This fluid then flows in the branch 3, but cannot return to the condenser from point A, because of the presence of the non-return valve 8. The fluid then passes into the evaporator 5, where it is accumulated; the valve 11 prevents communication between the outlet of the evaporator and the inlet of the compressor. Therefore, the mass of fluid that flows in the branches 1 and 3 after another configuration is re-established is augmented.

The invention is not limited to the embodiments described above by way of example, and it does embrace other variants. Thus, it is possible to use other types of fluid flow switching means incorporated in the modular component. In addition, the arrangements relating to the fluid flow switching means and the second expansion device in the monobloc module can be varied. The same applies to the respective positions of the various ports of the module.

What is claimed is:

1. A modular component for a refrigerant fluid circuit, wherein the circuit comprises:

a first branch containing an evaporator and a compressor, the compressor including an inlet end and an outlet end and being connected downstream of the evaporator, the evaporator including an inlet end and an outlet end;

a second branch containing a condenser and being connected to the first branch; and a third branch being connected in parallel to the second branch, the first and second branches forming a cooling loop;

a first expansion device connected in the cooling loop between the condenser and the evaporator, the first and third branches forming a heating loop;

a second expansion device in the third branch; and fluid switching means connected with the first branch for passing fluid from the first branch into the second and third branches;

wherein the modular component is a monobloc element comprising a body having first, second and third body ports for connection to the first, second and third branches of the circuit, and fourth and fifth body ports for connection to the inlet and the outlet of the compressor, the fluid flow switching means and the second expansion device being contained in the body.

2. A modular component according to claim 1, wherein the fluid flow switching means comprises a first three-way valve and a second three-way valve.

3. A modular component according to claim 2, wherein the first three-way valve has a first valve port connected to the first body port for connection to the evaporator outlet and a second valve port connected to the fourth body port for connection to the compressor inlet, wherein the second three-way valve has first, second and third valve ports connected to the fifth body port for connection to the compressor outlet, to the second body port for connection in the second circuit branch, and to the second expansion device, the expansion device being connected to the third body port, the body having a fourth circuit branch connecting the third valve port of the first valve to the second body port for connection in the second branch of the circuit.

4. A modular component according to claim 3, further including coordinated control means for the valves for selectively controlling the communication of: the first valve port of the first valve with the second valve port of the first valve, and the first valve port of the second valve with the second valve port of the second valve, to establish the cooling loop; the first valve port of the first valve with the second valve port of the first valve, and the first valve port of the second valve with the third valve port of the second valve, to establish the heating loop; and the second valve port of the first valve with the third valve port of the first valve, and the first valve port of the second valve with the third valve port of the second valve, to establish a fluid charging path.

5. A modular component according to claim 2, wherein the first and second valves each define valve axes, the valve axes being parallel to each other, and wherein each of said valves further includes a valve member displaceable along a corresponding valve axis.

6. A modular component according to claim 5, wherein the second expansion device defines an axis parallel to the valve axes, and wherein the second expansion device includes an adjustable valve member displaceable along the axis of the second expansion device.

7. A modular component according to claim 1, wherein the body includes a first main face; the first and third body ports being formed in the first main face.

8. A modular component according to claim 7, wherein the body further includes a second main face opposite to the first main face; the fourth and fifth body ports being formed in the second main face.

9. A modular component according to claim 8, wherein the body further includes a first side face joining the first main face to the second main face; the second body port being formed in the first side face.

10. A modular component according to claim 9, further including a second side face opposite to the first side face; the second side face including an orifice, the orifice being symmetrical with the second body port in the first side face; the body further including a cross passage for connecting said second body port to said orifice, to provide two alternative points for connection of the body in the second branch of the circuit.

11. A modular component according to claim 10, wherein the first three-way valve has a first valve port connected to the first body port for connection to the evaporator outlet and a second valve port connected to the fourth body port for connection to the compressor inlet, wherein the second three-way valve has first, second and third valve ports connected to the fifth body port for connection to the compressor outlet, to the second body port for connection in the second circuit branch, and to the second expansion device; the expansion device being connected to the third body port wherein the body further includes a fourth circuit branch connecting the third valve port of the first valve to the second body port for connection in the second branch of the circuit; wherein the cross passage further defines the fourth circuit branch and wherein the cross passage is in communication with the third valve port of the first valve and the second valve port of the second valve.

12. A modular component according to claim 2, wherein each of said valves is an electromechanical valve including control means mounted on the outside of the body.

13. A modular component according to claim 1, wherein the body is a block of metallic material.

14. A modular component according to claim 1, wherein the body is substantially in the form of a parellelepiped.

* * * * *